Oct. 9, 1956  G. A. VISSAC  2,765,911
FLUIDIZED PULSATING JIG
Filed Jan. 26, 1953  4 Sheets-Sheet 1

INVENTOR
GUSTAVE A. VISSAC
BY
Fetherstonhaugh & Co.
ATTORNEYS

INVENTOR
GUSTAVE A. VISSAC

Oct. 9, 1956  G. A. VISSAC  2,765,911
FLUIDIZED PULSATING JIG
Filed Jan. 26, 1953  4 Sheets-Sheet 3

INVENTOR
GUSTAVE A. VISSAC
BY
Fetherstonhaugh & Co.
ATTORNEYS

Oct. 9, 1956  G. A. VISSAC  2,765,911
FLUIDIZED PULSATING JIG
Filed Jan. 26, 1953  4 Sheets-Sheet 4

INVENTOR
GUSTAVE A. VISSAC
BY
Fetherstonhaugh & Co.
ATTORNEYS

United States Patent Office 2,765,911
Patented Oct. 9, 1956

2,765,911

FLUIDIZED PULSATING JIG

Gustave A. Vissac, Vancouver, British Columbia, Canada

Application January 26, 1953, Serial No. 333,062

8 Claims. (Cl. 209—455)

My invention relates to jigs or washing boxes in which fine materials, such as fine coal or minerals may be cleaned, concentrated or classified by means of pulsating currents of a fluid medium, such as water or air.

An object of the present invention is the provision of a pulsating jig having an artificial bed of heavy foreign material particles with means for reviving and refreshing this material when needed, in order continuously to maintain the bed in a lively condition.

Another object is the provision of a pulsating jig having an artificial bed of coarse, heavy foreign particles with means for removing any particles that may break up and become too small to serve a useful purpose.

A further object is the provision of a jig having a separating bed through which a fluid is pulsated upwardly, and including means for correcting variations of bed thickness and in the density of the medium.

A still further object is the provision in a pulsating jig having an artificial bed of heavy, coarse foreign particles, of means for correcting any variations in bed thickness and in the density of the fluid medium.

In jigs of this nature, the material to be treated is fed on to a bed or a screen in a washing box or chamber and the separating medium, such as water, is pulsated upwardly through the bed in any convenient manner. For example, a pulsating chamber may be provided beside the wash box into which water is continuously supplied by a valve-controlled pipe. From the pulsating chamber, the water is delivered in successive and alternate pulsations to the washing chamber. The pulsations may be created by the use of valves and compressed air at the top of the pulsating chamber, as in the Baum-type jig, or by a reciprocating piston at the top of said chamber, known as a piston-type jig; or by alternately closing and opening a combination of butterfly valves between the washing and pulsating chambers, as shown in my United States Patent Number 2,138,315; or by a swinging plate between the two chambers, known as a diaphragm jig; or by any combination of these arrangements.

The bed of material must be fluidized during the up stroke or pulsation. As is well known, the solid particles must be practically in suspension in the medium, that is, theoretically separated from each other during the up stroke, in order to obtain a free fall separation during the down stroke.

This works out very well for coarse materials, but when dealing with fine materials, they cannot be retained on a perforated screen or plate, and it is practically impossible to fluidize the bed because of the tendency of fine materials to pack.

In order to obviate these difficulties, it is necessary to provide an artificial bed of coarse, heavy foreign particles, over the screen. In the case of fine coal, such beds are generally composed of pieces of feldspar, and these are known as feldspar jigs. The particles are usually fairly large and flat, somewhat of the order of 2″ x 2″ x 1″. The feldspar forms a layer over the screen and the particles thereof act as clap valves which allow water to surge through the screen and bed on the up stroke in order to fluidize the bed. On the down stroke, the fine fluidized material being treated drops freely, each particle according to its own size and specific gravity. This results in the comparatively heavy material (refuse in the case of coal, or mineral in the case of ore) collecting at the bottom of the bed, and the lighter material at the top thereof.

Repetition of this action, permits the heavier particles to reach the screen when the clap valves are open or, in other words, when the feldspar pieces are raised from the screen and separated from each other. The heavier particles drop through the screen, into a hutch therebelow at the start of the down stroke while the valves are in this position, after which these particles are directed out of the bottom of the hutch into a suitable receptacle or conveyor, such as a dewatering elevator. The light particles build up on top of the bed and are eventually washed out of the washing chamber by the water.

The apparatus and the operation thereof described so far are well known in the art.

In order to obtain ideal separation of the material being treated, the condition in the jig must remain constant and this may be accomplished by means of automatic controls. However, the conditions are altered in the known jigs by two factors:

(1) Loss of bed fluidity due to the clogging or plugging of the interstices between the larger pieces of feldspar by an accumulation of heavy particles therein, and/or by foreign greasy or fluffy materials which are always encountered in the products of a mine, and (2) Variations in density of the medium owing to different quantities of heavy fine material dropping into the hutch, said material being dissolved or carried in suspension by the pulsating water medium.

The present invention overcomes these difficulties by providing (1) A semi-mobile or semi-permanent artificial bed, and (2) A control for the artificial bed utilizing variations in the medium density, and which is not influenced by the inevitable foaming of the medium.

For this purpose, the bed-carrying screen slopes slightly to a gate-controlled outlet. Means is provided for maintaining a bed of a minimum depth on the screen, and an evacuator periodically removes part of the bed. The feldspar or other foreign particles are washed during this operation and are returned to the bed after being separated from the fine refuse and particles. This prevents clogging of the bed and keeps the heavy, coarse particles fresh for proper operation in the bed. Controlling apparatus is provided for operating the evacuator when the density of the water in the hutch below the screen increases, and/or when the bed becomes too thick or dense. Signal means may be provided for indicating an excessively dense or thick bed, or a bed too thin for proper operation.

An example of this invention is illustrated in the accompanying drawings in connection with a jig of the type set forth in my United States Patent Number 2,138,315.

Figure 1:
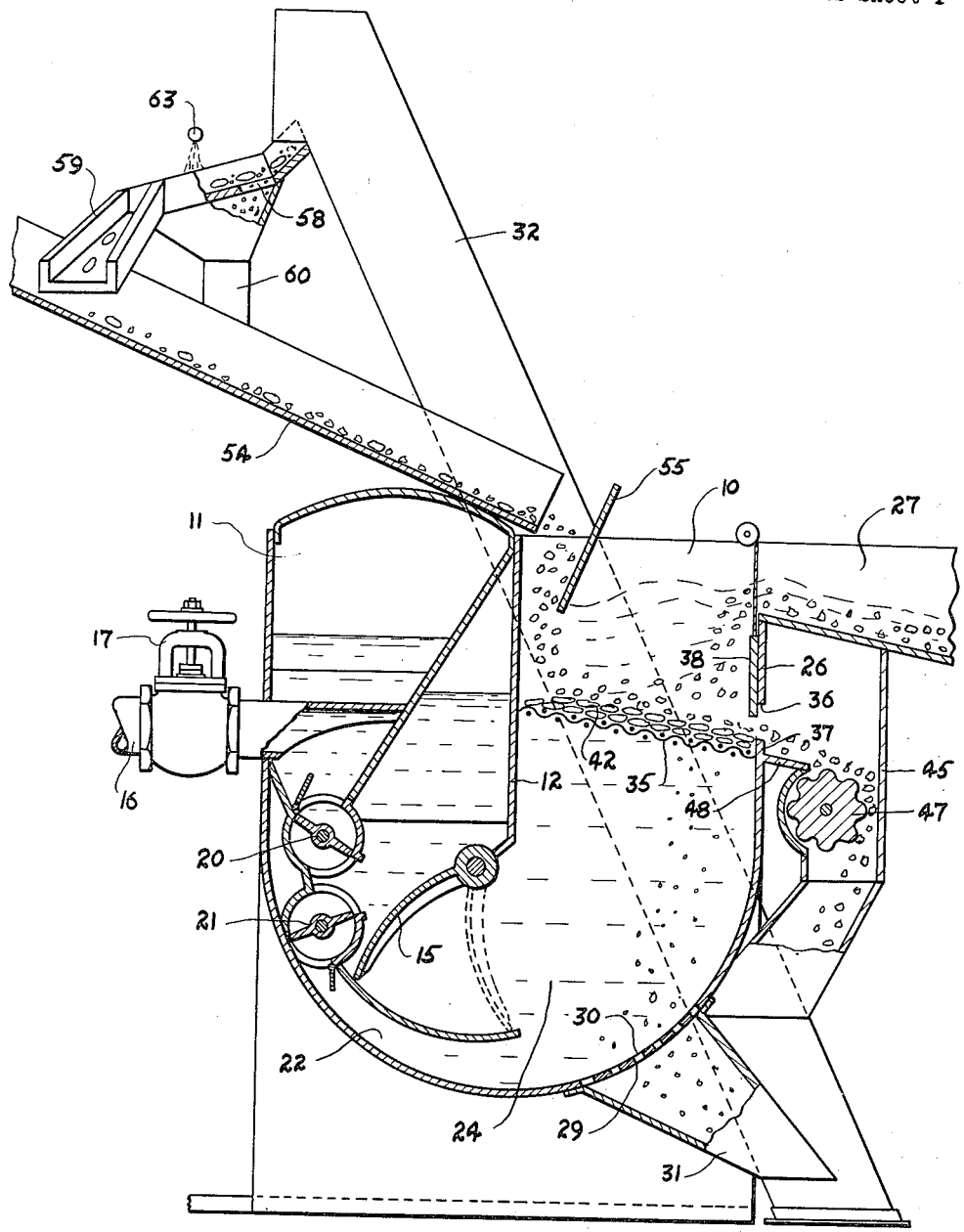
Fig. 1 is a vertical section through one form of fluidized pulsating jig.
Figure 2:
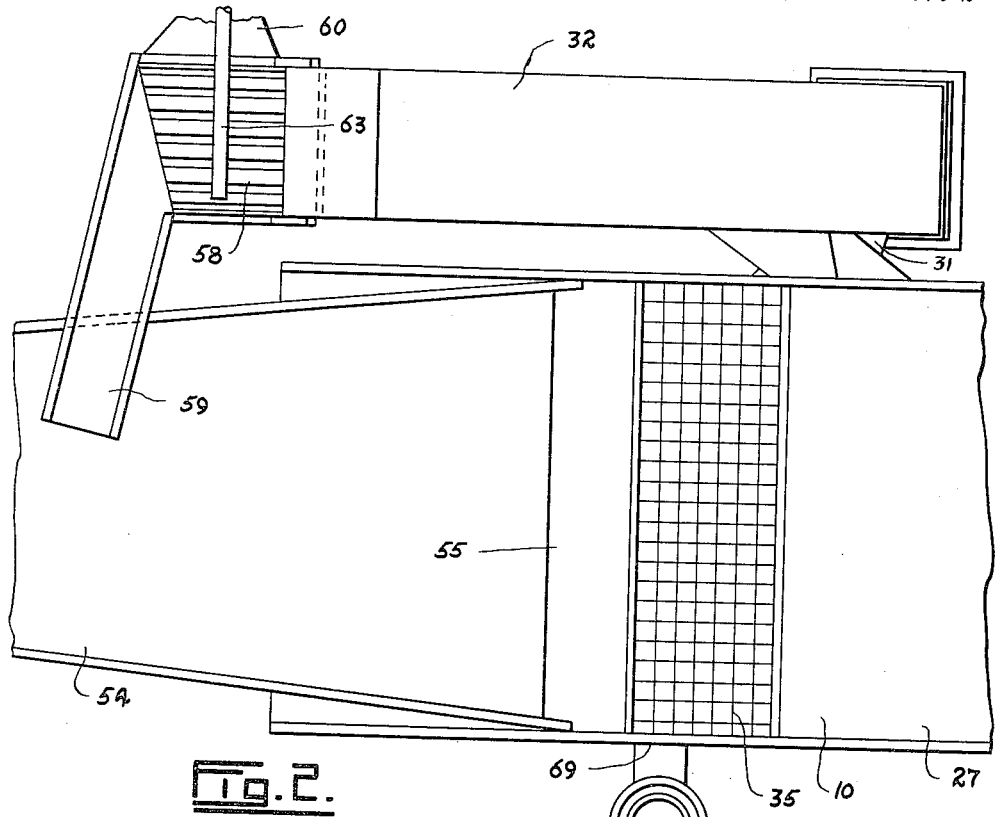
Figure 2 is a plan view of the jig.

Referring to the drawings, 10 and 11 are a washing box or chamber and a pulsating chamber, respectively, located side by side and separated by a wall 12. A swinging plate 15 hangs from the lower edge of wall 12 and is swung back and forth by a suitable source of power, not shown. The pulseparating medium, such as water, is supplied to the pulsating chamber by a pipe 16 having a control valve 17 therein. Water passes from the pulsating chamber through valve-controlled outlets 20 and 21, and a by-pass passage 22 into the bottom of the washing chamber 10 which is commonly known as a hutch 24.

A weir 26 is provided near the top of the washing chamber, and a discharge chute 27 extends therefrom. An outlet 29 is formed in the bottom of the hutch, said outlet being covered by bars or screening 30. A chute 31 extends from the outlet to a dewatering elevator 32.

The apparatus described so far is illustrated and described in my United States Patent Number 2,138,135. For the purpose of this invention, it is sufficient to say that water is directed in pulsations by the swinging plate 15 upwardly through the hutch 24 of the washing chamber 10.

A screening member 35, such as a perforated plate, screen, or bar screen, extends across the washing chamber 10 spaced below the weir 26 thereof, said screening member being inclined slightly downwardly towards an outlet 36 in the wall of the chamber. A barrage 37 is provided immediately below this outlet, and the size of said outlet is controlled either automatically or manually by a gate 38.

A semi-mobile bed 42 of comparatively large, heavy particles of foreign material is maintained on the screen 35. These particles may be flat pieces of feldspar. This bed is maintained at a minimum depth by the barrage 37.

A chute 45 extends downwardly from the outlet 36 to the elevator 32. Suitable means is provided in this chute for evacuating the bed 42 through the outlet. This may be accomplished by an elongated evacuator 47 extending parallel with and below the outlet. A plate 48 extends downwardly from the outlet to the evacuator. The evacuator is rotated in any suitable manner, such as by means of an electric motor 50. It is preferable to operate the evacuator periodically, and the controls for this purpose will be described hereinafter.

Materials to be treated, such as fine coal, are fed through an inclined chute 54 to the top of the washing chamber 10, said materials being spread laterally of the chamber by a feed plate 55 in line with the end of the chute.

The upper end of the elevator 32 discharges on to an inclined screen 58, from the lower end of which a trough 59 extends to a point over the feed chute 54, said trough discharging into the chute. A refuse chute 60 extends from beneath the screen 58 away from the jig.

Suitable means may be provided for washing materials on the screen 58. This may be accomplished by one or more spray pipes 63 extending over and above the screen from a suitable source of water suply, not shown.

The fine coal is directed by the chute 54 on to the bed 42 on the screen 35, said bed being maintained at a minimum depth by the barrage 37. Water is pulsated upwardly through the screen and bed as a result of the action of the pulsating chamber 11, and the swinging plate 15. As previously stated, the pieces of feldspar forming the bed act as clap valves which open on the upward stroke, allowing the heavy particles of the material being treated to drop downwardly on to the screen and eventually through said screen into the hutch. The light particles accumulate on the top of the bed and are washed out over the weir into the discharge chute 27 by the pulsating water. The heavier particles find their way through the outlet 29, chute 31, and into the elevator 32. The elevator discharges these particles on to the screen 58, and as they are small enough to pass through this screen, they are directed by the trough 60 out of the device.

When the bed 42 becomes too dense, as a result of clogging, or the accumulation of greasy or fluffy materials therein, or an excess of fine refuse, the evacuator 47 is set into operation. As the lower end of the bed actually rests on the evacuator, the operation of the latter discharges pieces of feldspar and any material carried thereby into the chute 45. When the density of the bed is restored to normal, the evacuator is stopped. The chute 45 directs the materials into the elevator 32 which discharges them on to screen 58 where they are washed by water from the spray pipe 63. The large pieces of feldspar are directed over the screen into trough 59 and thence to the chute 54 which feeds them back to the bed in the washing chamber. Particles of feldspar small enough to pass through screen 58, and fine refuse are directed out of the device by chute 60. This action thoroughly washes and revivifies the feldspar pieces, and it removes any material that may be clogging the bed 42.

Suitable means have been provided for controlling the density of the bed 42 in accordance with the density of the water in the hutch beneath said bed, and/or in accordance with the resistance of the bed to the water. Some of the materials passing through the screen are dissolved in this water or carried in suspension thereby. A testing tube 68 is provided which communicates at its lower end with the hutch of the washing chamber at 69. Water from the hutch rises in the tube to a level 71 which varies in accordance with the pressure of the water in the hutch, and the density of said water varies with that of the hutch water. A cup 72 floats on the water in the tube 68 and is partially filled with a suitable electrolyte 73 which may be water, a saline solution, or any other electrically-conducting fluid. The cup is grounded in any desired manner, such as by means of a wire 75 which is connected to the cup at one end and to the wall of the tube at its opposite end. This wire is long enough to permit the cup to move upwardly and downwardly with changes of level and/or density of the fluid in the tube.

Figure 5:
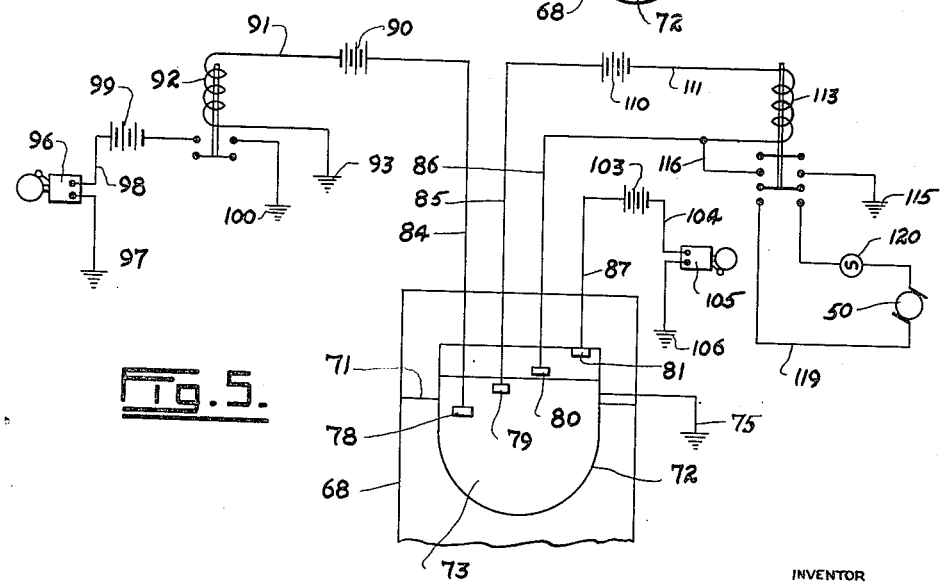
Figure 5 is an enlarged diagrammatic detail of the evacuator control.
Figure 3:
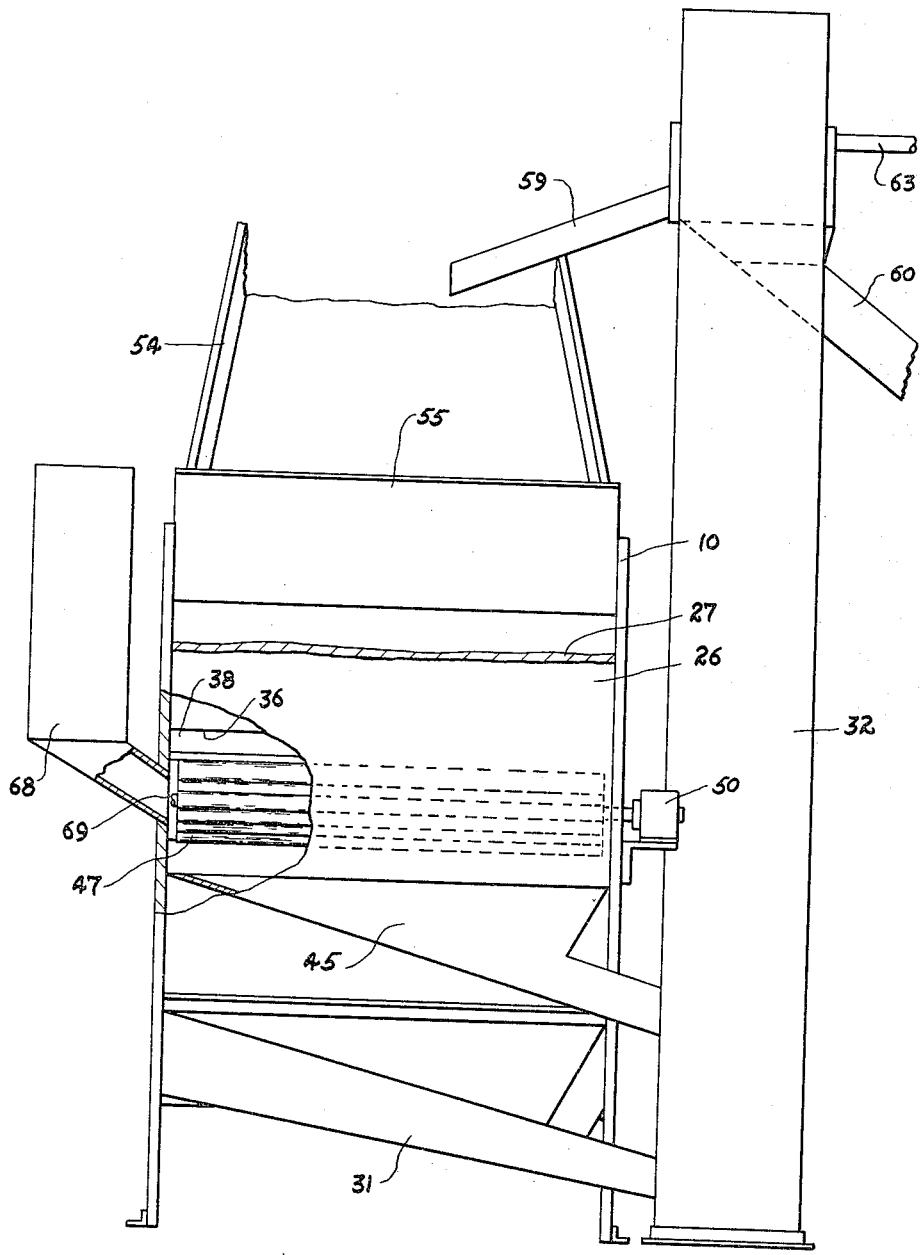
Figure 3 is an elevation of the discharge end of the jig.
Figure 4:
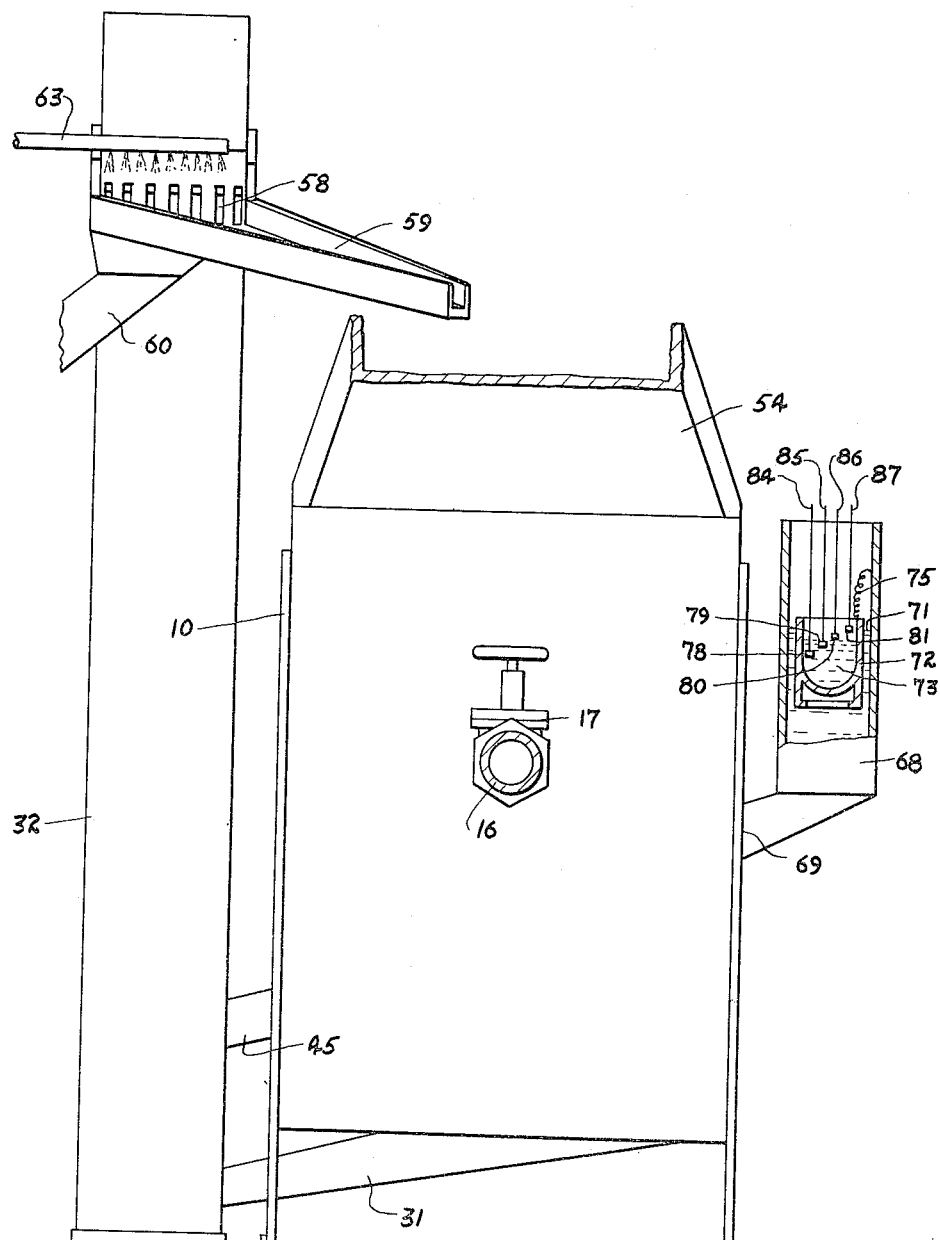
Figure 4 is an elevation of the opposite or feed end thereof.

A plurality of electrodes are suspended at different levels in the cup 72. In this example, electrodes 78, 79, 80 and 81 are suspended by means of wires 84, 85, 86, and 87 respectively. Electrodes 78, 79, 80 and 81 are positioned progressively higher in the cup, as clearly seen in Figure 5.

When the cup 72 rises in the liquid in the testing tube, as soon as the electrolyte 73 comes into contact with electrode 80, the motor 50 is started to set the evacuator 47 into operation. This action continues until the cup drops sufficiently to allow the electrolyte to clear electrode 79. If the electrolyte reaches electrode 81, a visual and/or audible signal is set into operation to warn the operator that the bed is much too dense and that the size of the outlet 36 should be increased by raising the gate 38. If desired, suitable means may be provided for automatically raising the gate at this time. On the other hand, if the cup drops sufficiently to allow the electrolyte to clear eelctrode 78, an audible and/or visual signal is set into operation to warn the operator that the bed is not dense enough and that it requires more feldspar and/or reduction of the size of the outlet. Any desired electrical circuits may be used in connection with these electrodes, and the following will serve as examples of circuits which may be used therewith.

The electrode 78 forms part of a circuit which sets an audible and/or visual signal into operation when the cup 78 moves downwardly to a point where the electrode is no longer in contact with the liquid 73. This may be accomplished by connecting the wire 84 to a suitable source of power, such as a battery 90. Another wire 91 extends from the battery to one end of the coil of an electro-magnet switch 92, the opposite end of said coil being grounded as indicated at 93. This switch is open when the switch circuit is closed. A bell 96, grounded at 97, is connected by a wire 98 to a suitable source of power, such as a battery 99, which is grounded at 100 when the switch 92 is closed. When the electrode 78 is out of the electrolyte 73, switch 92 is closed and bell 96 rings.

Electrode 81 is arranged so that an audible and/or visual signal is given when the cup 72 rises to the point where said electrode comes into contact with the liquid 73. In this example, wire 87 is connected to a suitable source of power, such as a battery 103 which, in turn, is connected by a wire 104 to a bell 105 grounded at 106. When the electrode 81 comes into contact with the electrolyte, the circuit is closed and bell 105 rings.

The electrodes 79 and 80 are arranged at different convenient levels, and they are electrically connected to the motor 50 so that said motor is set into operation when the electrolyte level touches electrode 80, and the motor remains in operation until the level of the electrolyte drops below the electrode 79. This may be accomplished by connecting the wire 85 to a suitable source of power, such as a battery 110, while a wire 111 connects the opposite side of said battery to one end of the coil of an electro-magnetic switch 113. This is a double switch which is normally open. The wire 86 is connected to the opposite end of the coil of this switch. One part of the switch 113 is grounded at 115, and the opposite side of said part is connected by a wire 116 to the wire 86. The other part of said switch is in a circuit 119 which includes the motor 50 and a suitable source of power, indicated at 120.

When the electrolyte 73 rises and touches the electrode 79, nothing happens since electrode 80 is still out of the liquid. However, when the latter electrode also is immersed, the coil of switch 113 is energized to close said switch. This action closes circuit 119 to start the motor 50. At the same time, the coil of the switch is grounded at 115 so that when the electrolyte drops below the electrode 80, the switch remains closed until the electrode 79 also is clear of the electrolyte. Thus, the motor starts to operate when the electrolyte level reaches a certain point, and stops when the level drops below another predetermined point.

In order to obtain the best results, the bed must be maintained at a given density in order that particles of one specific gravity will rise, and those of a greater specific gravity will drop downwardly. When fine coal is being treated, the coal particles rise to the top and the refuse drops to the bottom.

Two factors influence the density of the bed, (1) the density of the separating medium, and (2) the amount of solid material in the bed. For proper separation, when the density of the water increases, the amount of solid material in the bed must be reduced, and vice versa.

Considering a bed consisting of 60% clean water and 40% bed material, the average density would be as follows:

60% water at density 1 _____ = .6
40% bed material at average density 2 _____ = .8

Average density of bed _____ 1.40

Thus, particles of a specific gravity below 1.40 float to the top, and those with a specific gravity greater than 1.40 sink to the bottom.

The density of the water in the hutch which changes with the amount of material in suspension therein, influences the density of the bed on the screen. The small refuse particles dropping into the hutch may tend to increase the density of the water from 1 to say, 1.2, building up the average density as follows:

60% water at density 1.2 _____ = .72
40% bed material at average density 2 _____ = .80

Average bed density _____ 1.52

When the average bed density has been increased in this manner, the density of the water in the hutch and the testing tube of this apparatus has also increased. Everything else being equal, the buoyancy of a floating cup of a constant weight and volume will increase according to the principle of Archimedes. At this time, the cup displaces a smaller volume of water in the tube so that it floats higher. This raises the electrolyte level to electrode 80, setting the evacuator into operation to thin the bed down to, say, 25% solids. The composition of the bed would be changed as follows:

75% water at density 1.2 _____ = .90
25% bed material at average density 2 _____ = .50

Average bed density _____ 1.40

Thus, the average density of the bed is restored to produce the desired separation.

On the other hand, if the bed sets up an abnormal resistance to the flow of water therethrough as a result of clogging or of too great a depth, the pressure of the water in the hutch below the bed will increase. This causes the level of the water in the testing tube to rise which, in turn, raises the level of the electrolyte in the cup to come into contact with the electrode 80, thus starting the evacuator. When sufficient material has been removed from the bed to restore its normal resistance to the movement of water therethrough, the level of the water in the tube has dropped sufficiently to clear the electrolyte from electrode 79, so that the evacuator stops.

Another advantage of using a floating cup in the test tube lies in the fact that said cup is not affected by the inevitable foaming of the water medium, and said cup protects the electrodes from the foam. If the level of the water in the tube were used to close the circuits of the electrodes, the foam would make this very unreliable. On the other hand, the electrolyte in the cup presents an undisturbed liquid surface which is raised and lowered by changes of the level of the water in the tube, and/or by changes in the density of said water.

While this invention is particularly concerned with apparatus for treating fine materials, in which case a semi-mobile bed of coarse pieces of foreign material is requisite, it is to be understood that the apparatus may be used for coarser materials or for fine materials having comparatively coarse particles therein. In either of these cases, the pieces of foreign material may be omitted. In this case, the particles of material being treated and the separating medium would form the entire bed.

What I claim as my invention is:

1. In a fluidized pulsating jig having a bed of heavy, coarse foreign pieces on a screen in a washing chamber, means at the bed for periodically removing some of the pieces of foreign material therefrom, and means for receiving the removed pieces from the bed and returning at least some of them to the bed.

2. In a fluidized pulsating jig having a bed of heavy, coarse foreign pieces on a screen in a washing chamber, means at the bed for evacuating some of the foreign pieces therefrom when the separating fluid of the jig reaches a predetermined density beneath the bed, means outside the chamber for washing the evacuated pieces, and means for receiving at least some of said particles from the washing means and returning them to the bed.

3. In a fluidized pulsating jig having a bed of heavy, flattish coarse foreign pieces on a screen in a washing chamber, means at the bed for evacuating some of the foreign pieces therefrom when the resistance of the bed to the flow of fluid therethrough reaches a predetermined point, and means for receiving at least some of said particles from the evacuating means and returning them to the bed.

4. In a pulsating jig for fine materials, such as coal, an inclined screen having openings large enough to permit the largest particles to be fed to the jig to drop therethrough, a bed formed of comparatively large flattish pieces of foreign material maintained at a desired depth on the screen, means at the lower end of the bed for periodically evacuating some of the foreign pieces, means for receiving the pieces evacuated from the bed and separating any fine materials therefrom, and means for washing said pieces and returning them to the bed on the screen.

5. A fluidized pulsating jig for fine materials, such as coal, comprising a washing chamber, an inclined screen extending across the chamber spaced below the top thereof, the openings in said screen being big enough to permit the largest particles fed to the chamber to pass therethrough, a bed of comparatively large flattish heavy pieces of foreign material on the screen, means for admitting water into the chamber, means connected to the chamber for pulsating the water upwardly through the screen, an outlet from the chamber at the lower end of the screen, means at the lower end of the screen for retaining at least a minimum of pieces on said screen to maintain a predetermined resistance to the flow of water through the bed, means at the lower end of the bed for automatically removing some of the pieces of foreign material therefrom when said bed becomes clogged, and means for receiving the removed pieces from the bed and returning at least some of them to the bed.

6. A fluidized pulsating jig as claimed in claim 5 including means in the returning means for separating small particles breaking off the pieces from the latter before they are returned to the bed.

7. A fluidized pulsating jig for fine materials, such as coal, comprising a washing chamber, an inclined screen extending across the chamber spaced below the top thereof, the openings in said screen being big enough to permit the largest particles fed to the chamber to pass therethrough, a bed of comparatively large flattish heavy pieces of foreign material on the screen, means for admitting water into the chamber, means connected to the chamber for pulsating the water upwardly through the screen, an outlet from the chamber at the lower end of the screen, means at the lower end of the screen for retaining at least a minimum of pieces on said screen to maintain a predetermined resistance to the flow of water through the bed, an electric motor for operating the evacuator, and means for controlling the motor comprising a testing tube communicating with the washing chamber below the screen, said tube having therein water from the chamber, a cup floating in the tube, a liquid in the cup, two electrodes suspended at different levels in the cup, and and electric circuit including the electrodes and the motor for stopping the latter when the liquid in the cup drops below the lower electrode and starting the motor when the liquid reaches the higher electrode.

8. A fluidized pulsating jig as claimed in claim 7 including two additional electrodes suspended within the cup, one above and the other below the first-mentioned electrodes, and alarm circuits including the additional electrodes for indicating when the liquid in the cup reaches a certain point and drops below another point.

References Cited in the file of this patent

UNITED STATES PATENTS

| | | |
|---|---|---|
| 1,132,464 | Elmore | Mar. 16, 1915 |
| 1,149,641 | Elmore | Aug. 10, 1915 |
| 1,666,189 | Wolf | Apr. 17, 1928 |
| 2,138,315 | Vissac | Nov. 29, 1938 |
| 2,270,696 | Brentz | Jan. 20, 1942 |
| 2,303,367 | Kendall | Dec. 1, 1942 |

FOREIGN PATENTS

| | | |
|---|---|---|
| 661,441 | Germany | May 25, 1938 |